April 30, 1929.  H. P. KANAKY  1,711,414
METHOD OF MAKING ELECTRIC MOTOR STATORS
Filed Aug. 9, 1926    2 Sheets-Sheet 1
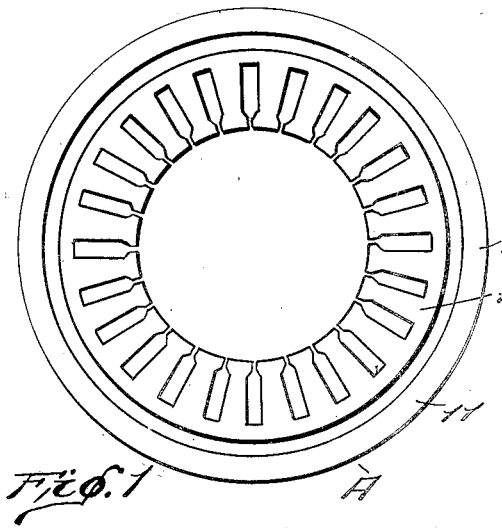
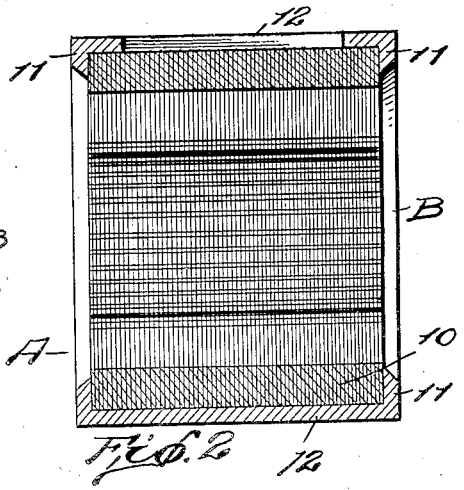
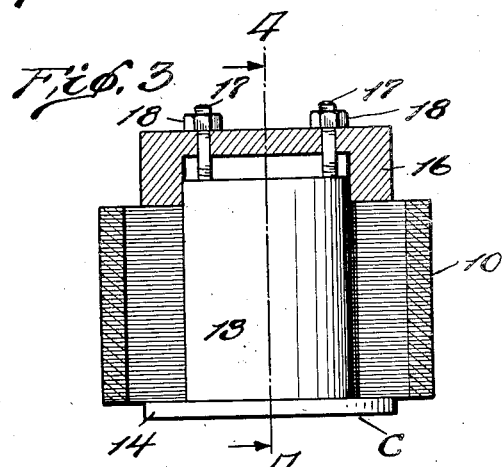
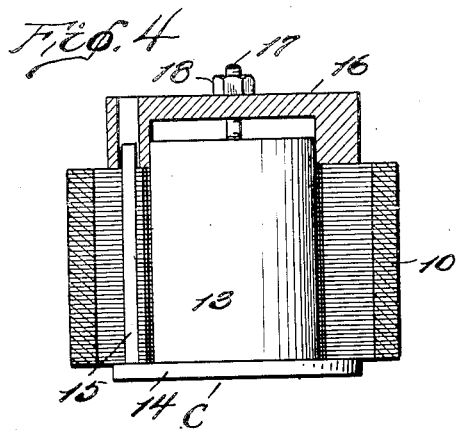
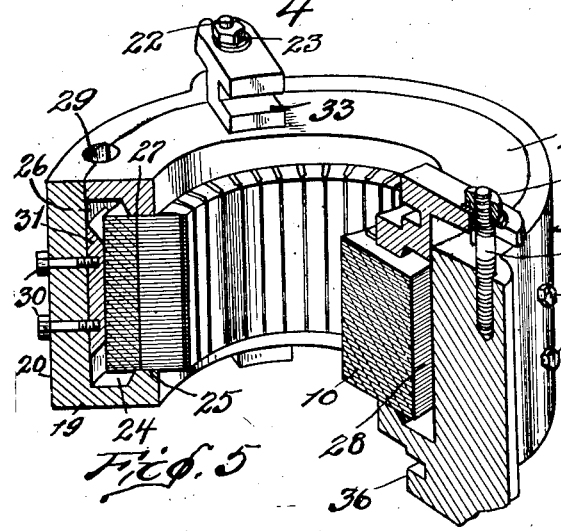
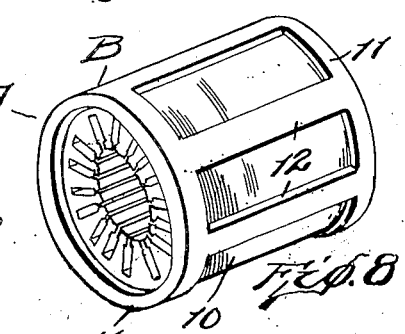
INVENTOR
HENRY P. KANAKY,
by R. S. Berry
ATTORNEY

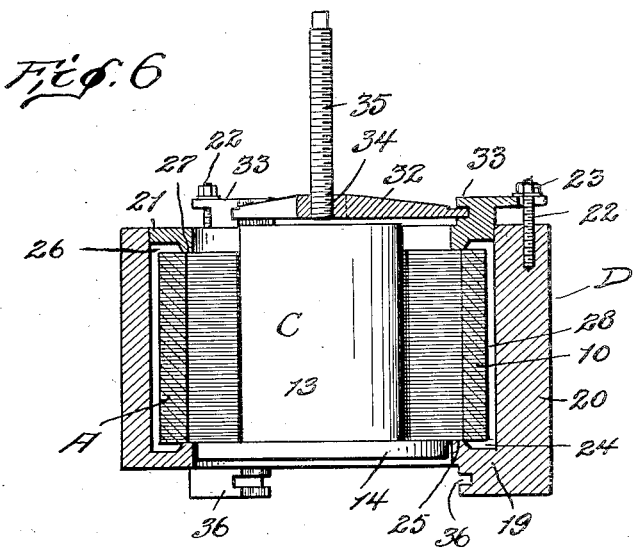

Patented Apr. 30, 1929.

1,711,414

UNITED STATES PATENT OFFICE.

HENRY P. KANAKY, OF LOS ANGELES, CALIFORNIA, ASSIGNOR TO KAN-DOR ELECTRIC CORPORATION, OF LOS ANGELES, CALIFORNIA, A CORPORATION OF CALIFORNIA.

METHOD OF MAKING ELECTRIC-MOTOR STATORS.

Application filed August 9, 1926. Serial No. 128,171.

This invention relates to electric motor stators and particularly pertains to a method of making same and more especially relates to a method of fabricating stators of the shell type in which laminæ are confined and held in a cage-like shell.

An object of my invention is to provide a method of making a stator embodying a shell or cage, constructed as a unit.

A further object is to provide a simple and inexpensive method of forming a one-piece, unitary shell or cage for electric motor stators of cast metal.

The invention resides generally in assembling a series of stator plates and moulding thereabout a metallic cage so as to retain the plates in place and at the same time form the stator into a unitary structure as hereinafter fully, clearly and concisely described, definitely pointed out in my claims and illustrated by the accompanying drawing (2 sheets) in which:—

Fig. 1 is an end elevation of a stator, constructed in accordance with my invention, with the usual winding omitted;

Fig. 2 is a longitudinal sectional elevation of the stator;

Fig. 3 is a sectional elevation showing the stator plates as assembled and secured upon a mandrel preparatory to molding;

Fig. 4 is a sectional elevation taken on the line 4—4 of Fig. 3;

Fig. 5 is a perspective view, partly in section, showing the assembled stator plates as secured in a mold preparatory to pouring;

Fig. 6 is a sectional elevation showing a means for extracting the mandrel from the mold;

Fig. 7 is a sectional elevation showing a means for extracting the stator, after molding from the mold.

Fig. 8 is a perspective view of a stator and shell constructed in accordance with my invention.

Referring more specifically to the drawing, A designates the stator body, which is cylindrical and is composed of a plurality of annular plates 10 formed with winding slots as shown in Fig. 1 and B shows the shell or cage, which is a unitary structure comprising end-rings 11 and ring connectors 12.

My method involves apparatus consisting of an assembler C comprising a mandrel 13 having a base flange 14 over which the plates 10 are placed and supported, a locator 15 for bringing the winding slots of the plates into relative registration, a press 16 and pressure means for the press, such as the bolts 17 and nuts 18.

The apparatus further involves a mold D, comprising two pieces: a combined drag 19 and cheek 20, of open-ring formation, a cope 21, substantially similar to the drag and securing means such as the bolts 22 carried by the cheeks and nuts 23.

As best shown in Fig. 5, the drag has formed therein an annulus or continuous ring-like cavity 24 of angle form, sectionally, and a flat or table 25 between the cavity and the inner periphery of the mold. Similarly the cope has formed therein a cavity 26 and a flat 27 inverted relative to the cavity and flat of the drag. Within the cheeks 20 and at spaced intervals, there are vertical cavities 28 whose ends communicate with the cavities 24 and 26 and a pouring opening 29 is provided in the cope.

By preference, the cavities 28 are formed by mounting and securing within the cheek 20, as by means such as the screws 30, a number of segmental plates 31, which are relatively spaced circumferentially of the cheek, the spaces therebetween forming the recited cavities 28.

In carrying out my method the plates 10, constructed as shown in Figs. 1 and 2 are placed in superposed relation over the mandrel 13 and supported upon the base flange 14 thereof, in which assemblage the locator 15 comprising a stem erected on the base and arranged to pass through aligned winding slots in the super-imposed plates serves to bring all the winding slots of the plates in registration. The press 16 is then set upon the "stack" of plates and by means of the bolts 17 and nuts 18 the plates are pressed to form a solid body as shown in Figs. 3 and 4.

The assembled plates, with their assembler, are then placed in the drag and cheek of the mold, with the base flange 14 engaging the inner periphery of the drag and with the lowermost plate 10 seating on the drag. The cope is then rested over the cheek with its inner periphery engaged by the outer periphery of the mandrel and with its underside seating at its inner margin on the upper-most plate 10. The cope is then drawn and secured as by bolts 22 and nuts 23 thereby clamping the assembled plates 10 between the drag and cope. After the plates are thus secured by the mold elements the press is separated from the mandrel and removed with the mandrel from the mold.

For the removal of the mandrel from the mold after the press has been separated therefrom, I provide means comprising a spider 32 removably and replaceably securable over the mold as by the recessed lugs 33, on the upper end of the mold, carrying a threaded bore 34 through which a threaded stem 35 is extended, as shown in Fig. 6. Obviously, by turning the stem 35 the mandrel may be readily forced from the mold.

Molten metal (such as alloy of aluminum and copper) is then poured into the pouring opening, which first fills the annular cavity in the drag (through the vertical cavities in the cheecks) then the cavities in the cheecks are filled and finally the annular cavity in the cope. In order to exclude molten metal from the apertures of the plates constituting the winding slots of the stator, the flats 25 and 27 of the drag and cope are seated on the end plates intermediate the margins thereof in such manner as to close the ends of the slots to the mold cavities.

By preference, and in order to obtain uniformly dense casting the mold is brought to a relatively high temperature prior to the pouring and following the pouring is allowed to gradually cool with the poured metal in a quiescent state.

Obviously, the plates, assembled to produce a cylinder and secured in the mold, as shown in Fig. 5, will have formed thereabout a shell or cage, constructed as a unit and comprising substantially L-shaped rings at its top and bottom outer margins and spaced connectors extending transversely of the outer peripheries of the plates and longitudinally of the cylinder between and integral with the two rings, thereby forming a substantially solid mass formation of the complete stator which requires no extraneous securing means.

In separating the mold parts for the removal of the stator with its shell, the cope is first released and removed, then the screws 30 holding the segmental plates of the mold are released from the mold and the stator with its shell and said mold plates are removed from the drag and cheek and finally the mold plates are removed from the stator.

For the facilitation of the removal of the stator and its molded unitary cage or shell from the mold, the mold is provided with recessed lugs 36, on its lower end, which are substantially similarly constructed and arranged as the recited lugs 33, at the top of the mold.

As shown in Fig. 7, the removal of the stator involves the upsetting of the mold, with the drag uppermost and the use of a plate 37 rested on the stator, the spider secured in the lugs 36 and the stem 35 turned against the plate 37.

I claim :—

1. The herein described method of making stators which consists in taking a plurality of plates having winding slots; in assembling the plates with said slots in registration; in subjecting the assembled plates to pressure; in placing the assembled and pressed plates in a mold and in casting a one-piece shell about the plates comprising end rings of angle section and connectors between the end rings extending over the outer margins of the plates.

2. The method of manufacturing motor stators having a cylinder composed of apertured annular plates arranged to form winding slots opening to the inner periphery of the cylinder which consists in disposing the assembled plates under pressure in a mold with the slots closed to the mold cavity, and casting molten metal around the external margins of the cylinder and transversely of its outer periphery.

3. The method of manufacturing motor stators having a cylinder composed of apertured annular plates arranged to form winding slots opening to the inner periphery of the cylinder which consists in disposing the assembled plates under pressure in a mold with the slots closed to the mold cavity, and casting molten metal around the external margins of the end plates and transversely of the outer peripheries of the intervening plates at spaced intervals circumferentially of the assembled cylinder.

4. The method of producing motor stators, consisting in superimposing a plurality of apertured annular metallic stator plates with the apertures of contiguous plates in register, holding the assembled plates in superficial contact under pressure within a mold with the apertures in the end plates closed to the mold cavity, and casting molten metal externally of the assembled plates in integral relation thereto, whereby a single unit is formed by the plates and cast metal, with the cast metal excluded from the apertures in the plates.

In testimony whereof, I have affixed my signature.

HENRY P. KANAKY.